(12) United States Patent
Mayer

(10) Patent No.: US 10,428,856 B2
(45) Date of Patent: Oct. 1, 2019

(54) EXPANDING RIVET CONNECTION AND ASSEMBLY METHOD

(71) Applicant: Kathrein Werke KG, Rosenheim (DE)

(72) Inventor: Josef Mayer, Rosenheim (DE)

(73) Assignee: Kathrein SE (DE)

( * ) Notice: Subject to any disclaimer, the term of this patent is extended or adjusted under 35 U.S.C. 154(b) by 305 days.

(21) Appl. No.: 15/296,720

(22) Filed: Oct. 18, 2016

(65) Prior Publication Data
US 2017/0108024 A1    Apr. 20, 2017

(30) Foreign Application Priority Data
Oct. 19, 2015   (DE) .......................... 10 2015 117 784

(51) Int. Cl.
F16B 19/10    (2006.01)
F16B 5/04     (2006.01)
(Continued)

(52) U.S. Cl.
CPC ............. F16B 19/10 (2013.01); B21J 15/043 (2013.01); F16B 5/04 (2013.01); F16B 5/065 (2013.01);
(Continued)

(58) Field of Classification Search
CPC .... F16B 19/10; F16B 19/1081; F16B 5/0642; F16B 5/065; F16B 5/04; F16B 35/06; B21J 15/043; Y10T 29/49956; Y10T 29/49959; Y10T 29/49957
USPC .... 29/446, 447, 524.1, 523, 525.05, 525.06, 29/512; 403/280, 242; 411/43, 501, 504, 411/34, 171; 269/3, 6; 164/111, 112
See application file for complete search history.

(56) References Cited

U.S. PATENT DOCUMENTS 3,352,193 A * 11/1967 Lerich ................. E21D 21/0026
411/79
4,074,609 A *  2/1978 Busler .................. F16B 13/065
411/45
(Continued)

FOREIGN PATENT DOCUMENTS

DE        1912636 U      3/1965
DE        1979958   *   2/1968
(Continued)

OTHER PUBLICATIONS

Artur Fischer; Bolt-shaped fastening element (EPO English Machine Translation); Oct. 15, 2018; pp. 1 and 2.*

*Primary Examiner* — Bayan Salone
(74) *Attorney, Agent, or Firm* — Fish IP Law, LLP

(57) ABSTRACT

Provided is an expanding rivet connection for the connection of at least two components to be joined comprising an expanding rivet, comprising an expanding rivet body, which is shaped so that it can be inserted through openings into the first component to be joined, and a threaded part, which is shaped so that it protrudes, at least in part, after insertion from the first component to be joined, an expanding rivet mandrel, which is constructed so that it can be pushed through an opening in the expanding rivet into the expanding rivet body in order to protrude through the first component to be joined, and a clamping element, which is constructed to be screwed to the threaded part of the expanding rivet in order to connect at least a third component to be joined to the first component to be joined.

14 Claims, 2 Drawing Sheets

(51) Int. Cl.
*F16B 5/06* (2006.01)
*F16B 35/06* (2006.01)
*B21J 15/04* (2006.01)

(52) U.S. Cl.
CPC ........ *F16B 5/0642* (2013.01); *F16B 19/1081* (2013.01); *F16B 35/06* (2013.01); *Y10T 29/49956* (2015.01); *Y10T 29/49957* (2015.01); *Y10T 29/49959* (2015.01)

(56) References Cited

U.S. PATENT DOCUMENTS

| | | | |
|---|---|---|---|
| 5,259,689 A | | 11/1993 | Arand et al. |
| 5,569,091 A | * | 10/1996 | Haage ................... F16B 13/065 411/40 |
| 7,682,116 B2 | * | 3/2010 | Cabrele ................ F16B 13/001 411/451.1 |
| 2002/0106259 A1 | * | 8/2002 | Kaufman ............. F16B 33/006 411/396 |
| 2017/0268555 A9 | * | 9/2017 | Schneider ................ F16B 5/04 |

FOREIGN PATENT DOCUMENTS

| | | |
|---|---|---|
| DE | 1979958 U | 2/1968 |
| DE | 1020040240088 A1 | 12/2005 |

* cited by examiner

EXPANDING RIVET CONNECTION AND ASSEMBLY METHOD

This application claims the benefit of priority to German Patent Application No. 10 2015 117 784.6, filed Oct. 19, 2015.

FIELD OF THE INVENTION

The invention relates to an expanding rivet according to the generic term in patent claim 1 as well as a method for mounting it in accordance with the generic term in patent claim 14.

BACKGROUND OF THE INVENTION

Expanding rivets are known to be used for the creation of permanent joints between two components, with the transmission force primarily generated by a form fit. They can replace joints made from screws, discs and nuts where the joint does not need to be released again or where release is even undesirable.

Conventional expanding rivets are made from a bolt with a rivet head and an expanding rivet body. For riveting, the expanding rivet body is pushed through the rivet holes previously punched or drilled into the components to be joined, e.g. the mounting panel. The expanding rivet is held at the already existing rivet head with a tool as a brace, and the free end of the expanding rivet body is deformed by pressure or impact onto the closing head. This method of riveting can only be used for riveting connections which are accessible from both sides.

For installation at locations which are only accessible from one side, so-called blind rivets are often deployed. These consist of a hollow rivet with a mandrel passing through its middle from the rivet head, which presses against the expanding rivet body of the hollow rivet, and a drawing section protruding beyond the rivet head, which is connected to the mandrel via a predetermined breaking point. For riveting, the blind rivet is inserted into the rivet hole with the rivet head on the outside, until the rivet head makes contact to the component surface. Afterwards, the rivet mandrel is pulled into the rivet by applying a strong force to the drawing mandrel. This expands and deforms the rivet body. The drawing mandrel breaks at the predetermined breaking point. The required tensile force can only be applied by means of force-enhancing tools.

Expanding rivets, which can be mounted from a single side, are not consistently free of play within the range of supported forces. This means that if a force below that of the maximum rated value is applied, shifting of the joined components is possible.

Furthermore, expanding rivets currently have to be mounted from both sides in order to obtain a connection which is play-free. This is inconvenient or impractical, especially in radio frequency (RF) applications, e.g. for larger assemblies such as antennas. Such a connection has been disclosed, for instance, in German Patent DE 19840014 C1.

For this reason, one object of this invention is to provide an expanding rivet connection which can be installed from a single side and which supports the joined components up to the rated load and creates a play-free connection between them. This purpose is achieved by the features described in claims 1 and 14 of the invention. Advantageous embodiments are the subjects of the dependent claims.

SUMMARY OF THE INVENTION

According to this invention, provided is an expanding rivet connection for the connection of at least two components to be joined comprising an expanding rivet, comprising an expanding rivet body, which is shaped so that it can be inserted through openings into the first component to be joined, and a threaded part, which is shaped so that it protrudes, at least in part, after insertion from the first component to be joined, an expanding rivet mandrel, which is constructed so that it can be pushed through an opening in the expanding rivet into the expanding rivet body in order to protrude through the first component to be joined, and a clamping element, which is constructed to be screwed to the threaded part of the expanding rivet in order to connect at least a third component to be joined to the first component to be joined.

In a different embodiment, an expanding rivet connection as described above is provided for the connection of at least three components to be joined wherein the expanding rivet body is shaped in such a way that it can be inserted in addition through openings in the a second component arranged onto the first component to be joined, and the threaded part, is constructed in such a way that, after insertion, it protrudes at least in part through from the first component to be joined and the second component to be joined, and the expanding rivet mandrel is constructed so that it can be pushed through the opening in the expanding rivet into the expanding rivet body in order to join the first and the second components to be joined together and the clamping element is constructed to be screwed to the threaded part of the expanding rivet in order to connect at least a third component to be joined, which is arranged on the second component already joined to the first component to be joined.

In a further embodiment, the clamping element is constructed as a spring element in the form of a nut with a spring washer.

The connection between the first two components to be joined by means of an expanding rivet and the expanding rivet mandrel basically takes the form of a pre-assembly, i.e. both components are connected firmly enough to each other that they can be subjected to an intermediate processing step, before one or several further components are connected to the two already joined components by means of the clamping element. Such an intermediate step could e.g. be the dipping into a wave soldering bath, in order to provide an electrical contact between the first and the second components to be joined.

On account of the connection of the third component to be joined via the clamping element, the connection between the joined component is pre-tensioned. On account of this pre-tensioning, all components to be joined can be connected free of play, even if there are variations in the thicknesses of the components.

In a further embodiment, the expanding rivet body is round or n-cornered while the threaded part is constructed as n-cornered.

The construction of the threaded part with n corners allows the unilateral mounting of the expanding rivet connection, as it provides an anti-rotation mechanism. The shape of the expanding rivet body can be round or n-cornered, depending on the application. Cuts or other constructive features can be present for the optimization of the creation of the joint and as anti-rotation elements.

In a further embodiment, at least one stop is arranged at the expanding rivet at least between the expanding rivet body and a threaded part. Advantageously, the stop is designed in such a way that a surface facing the threaded part serves to protect the expanding rivet from being pulled out when the clamping element is screwed tight, where the thickness of the stop determines the travel of the pre-tension generated by screwing tight the clamping element (13).

The main purpose of the stop is to prevent the expanding rivet from being pulled out when the clamping element is tightened. By the provision of a stop, a path-controlled pre-tension can be realized, so that frictional forces arising from the material or construction become irrelevant when the clamping element is tightened so that a play-free connection can be created between the components to be joined. The thickness of the stop defines the travel for the pre-tensioning. By means of the provision of further stops, i.e. on the threaded part, different pre-tensions can be implemented between the components to be joined, in order to realize a play-free connection between them.

In a further embodiment, it is designated that at least one spacer is arranged on the expanding rivet between the expanding rivet body and the threaded part. According to one embodiment, the spacer is connected to the expanding rivet via at least one elastic element. In a further embodiment two spacers are provided on opposite sides on the expanding rivet between the expanding rivet body and the threaded part. In one embodiment, the thickness of the spacer corresponds to the distance between two components to be joined. In a further embodiment, it is provided that each of the spacers are shaped differently or identically as cylinder, sphere, cone or double-cone or rectangular. In a further embodiment, the spacer is constructed as enclosing the circumference of the threaded part.

The spacer compensates for the distance between the components to be joined. Such a distance can arise on account of thickness variations during manufacture or be a feature of the components to be joined. In the case of RF applications, the distance can, for example, arise from the fact that one of the components used as a screening cover, requires, on account of its shape and function, a distance from the component it is joined to. The purpose of the spacer is then, in addition, to compensate for the force from the clamping element onto the particular component to be joined, in order to prevent the deformation of this. This is supported by the elastic element because it allows some movement of the spacer during installation. This means that the pre-tensioned components to be joined remain in the pre-defined position even when exposed, due to environmental influences, to thermal or mechanical loads. This is supported by a shape which allows movement in response to forces acting on the elements. In this way, the at least one elastic element is loaded to a lesser degree and not deformed.

Furthermore, provision is made in the invention that the expanding rivet body and/or the threaded component and/or the expanding rivet mandrel and/or the clamping element is made from a glass fiber-reinforced plastic.

Glass fiber-reinforced plastic is a very hard material, which, if used for small components, can support high forces without being damaged or deformed so that a strong connection is created. This also allows the creation of a play-free connection.

A method for the assembly of the expanding rivet connection according to one of the above claims involving the following steps forms part of the invention:

Step 1: Insertion of the expanding rivet body of the expanding rivet in openings in the first component to be joined (21) and the other or additional component(s) to be joined (22), if present, Step 2: Insertion of the expanding rivet mandrel into the opening of the expanding rivet so that a firm connection is made between the first component to be joined (21) and the other or additional component(s) to be joined (22), if present, Step 3: Application of at least a third component to be joined to the first component to be joined or any other component(s) to be joined already joined to the first component to be joined via the threaded part of the expanding rivet, Step 4: Attachment of at least a third component to be joined by means of the clamping element to the first component to be joined or to the other or additional component(s) to be joined already joined with to the first component to be joined.

Within the framework of the present invention, it is further provided, that the process comprises, between steps 2 and step 3, a further step 2a, namely, for example, the introduction of the first component to be joined being provided with the expanding rivet or of the joint first and further components being provided with the expanding rivet into a device for forming electrical connections between the components to be joined.

The advantages of the stepwise installation are described above.

The expanding rivet connection according to the invention and the method allows the play-free connection of two or more components to be joined together. This provides high flexibility during the mounting of the third and any further components to be joined, on account of the threaded part protruding from the components. On account of the pre-assembly at this stage of the first or the first two components to be joined, a firm connection is formed making it possible to carry out one or several intermediate steps before the third and any further components are added.

Further features and advantages of the invention result from the following description of implementations of the invention with figures and drawings showing details covered by the invention and its claims. Any variant of the invention is realized by implementing individual features, individually or in any combination.

Preferred implementations of the invention will be described the following in more detail with reference to the enclosed drawings.

DETAILED DESCRIPTION

In the following descriptions of the figures the same elements or functions are marked with the same identifiers.

Figure 1:
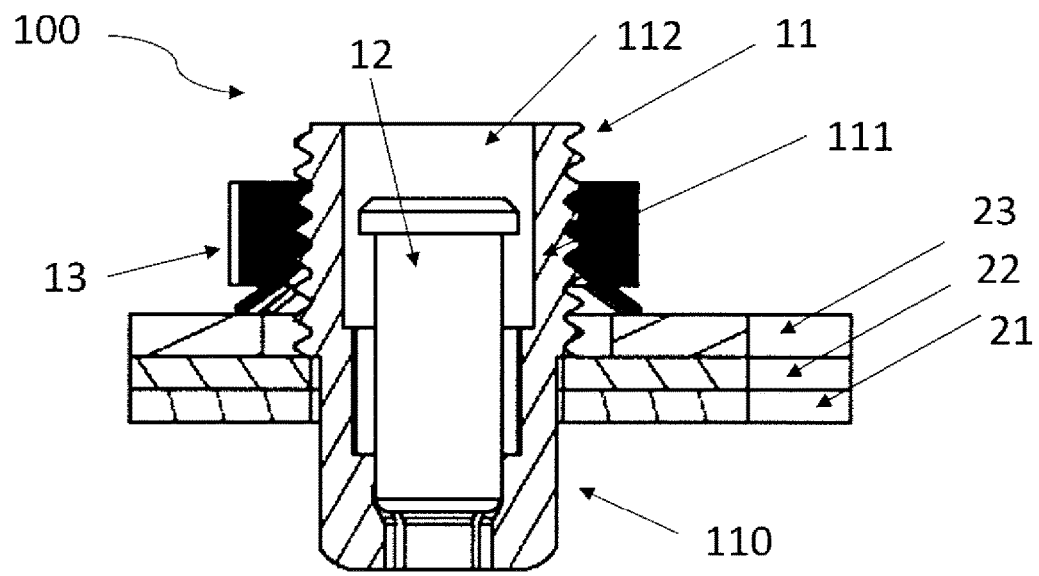
FIG. 1 shows a section of an installed expanding rivet connection according to an implementation of this invention.

FIG. 1 shows a section of an expanding rivet connection 100, which in this representation connects three components to be joined (21, 22, 23); in this view the expanding rivet mandrel 12 is not yet fully pressed into the expanding rivet 11. The expanding rivet connection 100 comprises three parts, an expanding rivet 11, an expanding rivet mandrel 12, which is inserted into an appropriate opening in the expanding rivet 11, and a clamping element 13, here in the form of a nut with spring washer. The clamping element 13 does not have always be constructed as a spring element; a nut or bayonet cap are also possible implementations.

The expanding rivet 11 is essentially subdivided in two parts, an expanding rivet body 110, which is constructed in such a way that it is inserted, after completion of the assembly, into the components to be joined 21, 22 and 23, and a threaded part 111, which is constructed in such a way, that, after insertion of the expanding rivet 11 into the corresponding mounting holes in the components to be joined 21, 22 and 23, it protrudes at least partially from these. For assembling the connection, the expanding rivet 11 is, first of all, inserted into the mounting holes of two of the components to be joined 21, 22. At the boundary between the expanding rivet body 110 and the threaded part 111, the expanding rivet 11 includes preferably a stop 113 as shown in FIG. 2, up to which the expanding rivet 11 is inserted into the mounting holes in the components to be joined 21, 22.

The expanding rivet mandrel 12 is pressed through an opening 112 in the expanding rivet 11 into the expanding rivet 11 from the same side as the expanding rivet 11 is inserted into the components to be joined 21 and 22. This creates, after the first assembly step, a firm connection between the two components to be joined 21, 22. In RF applications, these components 21, 22 are usually an antenna element 21 mounted to a circuit board, for example a dipole, and a screening cover 22. The connection is made in such a way that the threaded part 111 of the expanding rivet 11 protrudes on the side pointing away from the dipole, i.e. the bottom side of the circuit board, but, depending on the application, this can also be carried out otherwise.

Figure 2:
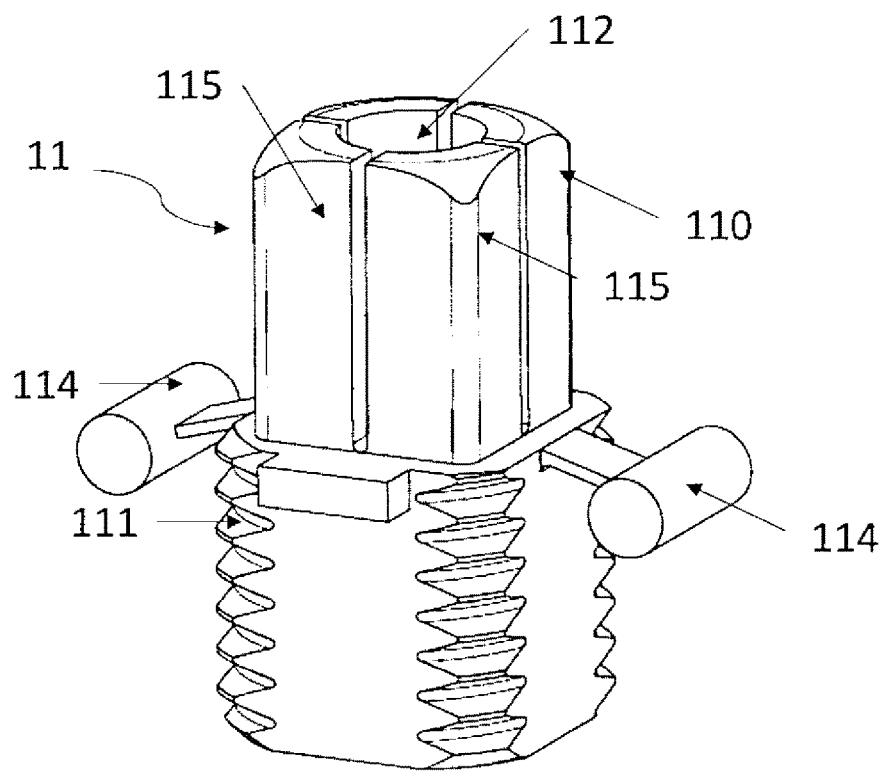
FIG. 2 shows a section of an installed expanding rivet according to a different implementation of this invention.

By opening the jaws 115 of the expanding rivet body 110, as shown in FIG. 2, the system can easily compensate for thickness tolerances in the components 21, 22 to be joined, because an undercut of the jaws on the components 21, 22 is not required for clamping, but a high frictional force is created between the components 21, 22.

The shape of the expanding rivet 11 mainly depends on the specifications arising from the application, but its advantage is that the mounting from one side ensures protection against rotation. This is implemented by the threaded part 111 of the expanding rivet 11 not being round but being preferably shaped n-cornered, i.e. at least flat on one side, so that the torque acting on it can be absorbed. The expanding rivet body 110 can, in contrast, be either round or n-cornered. Because the shape is not completely round, the connection is protected against rotation and the orientation of the components, such as between the dipole and the screening cover, is fixed with regard to each other.

Now the two components 21, 22, already joined together can, if required, be processed in an intermediate step, e.g. an electrically conducting connection can be made. This can, for example, be carried out by passing them through a wave soldering bath.

The first two components to be joined 21, 22 are firmly connected together by the expanding rivet 11 and the expanding rivet mandrel 12. In order to connect a further component 23 to the other already assembled components (21, 22), a clamping element 13, which is constructed as a spring element, is provided. This spring element 13 is screwed to the threaded part 111 of the expanding rivet 11, in order to connect a third component 23 mounted on at least one of the two joined components 21, 22 in such a way, that the connection between the components 21, 22, 23 is pre-tensioned.

In RF applications, the third component to be joined 23 can be e.g. an adapter plate or a different part, which is to be mounted to the back of the second component 22, e.g. a circuit board connected to the screening cover with a dipole arranged on top of it.

The spring element 13 is preferably implemented in the form of a nut with a spring washer, because in this way pre-tensioning can easily be provided, which is defined by a simple force or torque. Thanks to the spring element 13 constructed as a nut with a spring washer, the connection can be pre-tensioned accurately compensating for settling of the components 21, 22, 23 to be joined or an expansion of the components 21, 22, 23 on account of temperature variations. Preferably a slotted washer is deployed, which, depending on the application, may not be necessary. If the number of slots is reduced or they are omitted altogether, a higher spring force is required, i.e. a higher force to compress the spring to the same position.

On account of the spring element 13 and the thread with the option to exert an appropriate force on the components 21, 22 and 23 to be joined, i.e. pre-tensioning of the assembly, a play-free connection is created over the entire joint area between the components 21, 22 and 23.

On account of the threaded part 111 of the expanding rivet 11 protruding from the components 21, 22 and 23 to be joined, further components can be joined on (not shown) in addition to the third component 23. This can be achieved by mounting this further component to be joined directly to the third component 23 or by mounting it via a further spring element upside-down or reversed. A further option is the addition of a further component to be joined, e.g. in the case of an RF application a reflector, which can be fastened on top of the spring element 13 thanks to a recess or opening and be tightened by means of a union nut. In addition, further stops can be attached to the threaded part 111 of the expanding rivet 11 if this is necessary or advantageous for the particular application.

Preferably the entire expanding rivet connection 100 is made from a glass fiber-reinforced plastic, even though it is also possible to make only individual parts from this material. Glass fiber-reinforced plastics are much harder than the previously deployed polyamide plastics, such as Nylon, i.e. greater forces can be absorbed. This allows the deployment of great forces and pre-tensioning.

FIG. 2 shows a view of an expanding rivet 11 according to a different construction. The identifiers used in FIG. 1 refer to the same parts, which is why they are not repeated here. The expanding rivet 11 shown includes in addition to the stop 113, at least one spacer 114 at the transition between the expanding rivet body 110 and the threaded part 111. The spacer 114 is attached to the expanding rivet 11 via an elastic element so that it can move in and against the insertion direction of the expanding rivet 11. Preferably two stops 113 and two spacers 114 are located opposite of each other.

The spacers 114 in FIG. 2 are constructed as cylinders but they can also have a different shape as long as they have the desired thickness. The further the shape deviates from that of a circle or cylinder, the higher spring rates are required. This will be explained in more detail with reference to FIG. 3.

The spacer 114 can also be constructed completely surrounding the expanding rivet 11, but in this case, it has to be ensured, that the properties of the component 21 or 22 to be joined are not detrimentally affected.

Figure 3:
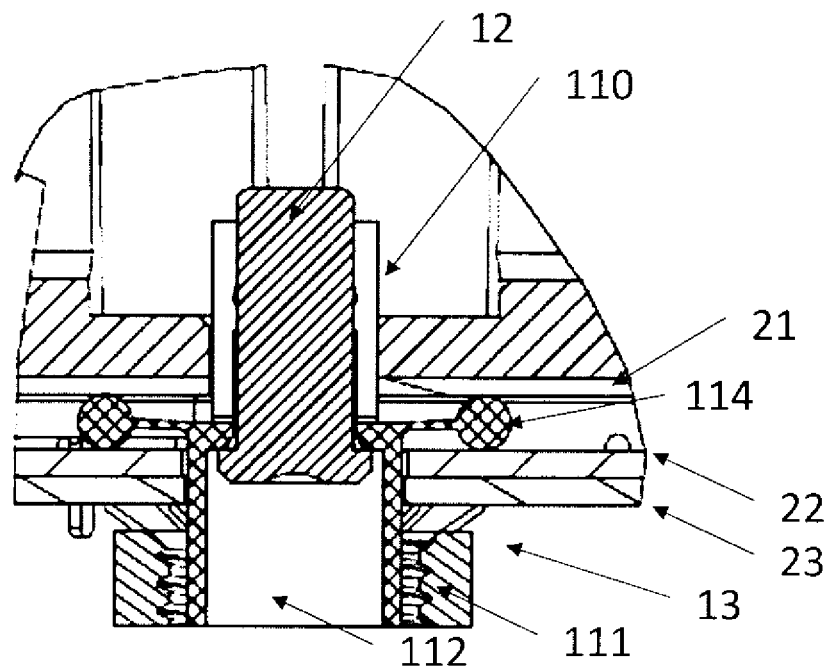
FIG. 3 shows a section of the spacer for the installed expanding rivet in FIG. 2 according to an implementation of this invention.

FIG. 3 shows a section of the spacer 114 of the expanding rivet 11 from FIG. 2. The identifiers used in FIGS. 1 and 2 indicate the same parts, which is why they are not repeated here. The representation in FIG. 3 shows the fully pre-tensioned and joined components 21, 22, 23, spring-loaded by spacer 114, i.e. the nut 13 has been screwed to the position where the spring washer is fully pre-tensioned. The stop 113 and the spacer 114 are located between the first component to be joined 21, which, in the case of RF applications, might be an antenna element, e.g. a dipole installed on a circuit board, and the second component 22, which, in the case of RF applications might be a screening cover. Because, on account of the pins or connections, the screening cover 22 for the circuit board is arranged at a specific distance, e.g. 2 mm, it is possible to deform and therefore damage the screen cover if it is attached with the nut applying too much force. Furthermore, in such a case, the contact pressure would be diminished. This disadvantage is overcome by the spacer 114. On account of the elastic elements of the spacer 114, the thickness variations of the spacer can be compensated for.

Preferably the spacer 114, as shown in FIG. 3, has a cylindrical or approximately spherical shape, because these shapes are associated with smaller required spring rates. The main reason for this is that, by screwing down the clamping element 13, a pre-tensioning force is created. The acting forces are absorbed by the spacer 114 with its elastic elements. The shape of the spacer determines whether the elastic elements have to be deformed by a higher application of force, that is a higher spring rate, or whether the spacer is able to rotate or roll on the spot. This means that the elastic elements are not deformed on account of the rotation or rolling of the spacer 114, but that their elastic effect can be fully utilized. The frictional forces acting on a spacer 114 of this shape are much lower than the rotating force. If a rounded shape is chosen for the spacer 114, e.g. a sphere or a cylinder, this results, for this reason, in a much lower spring rate having to be applied than with any non-circular spacer (114) shapes.

Figure 4:
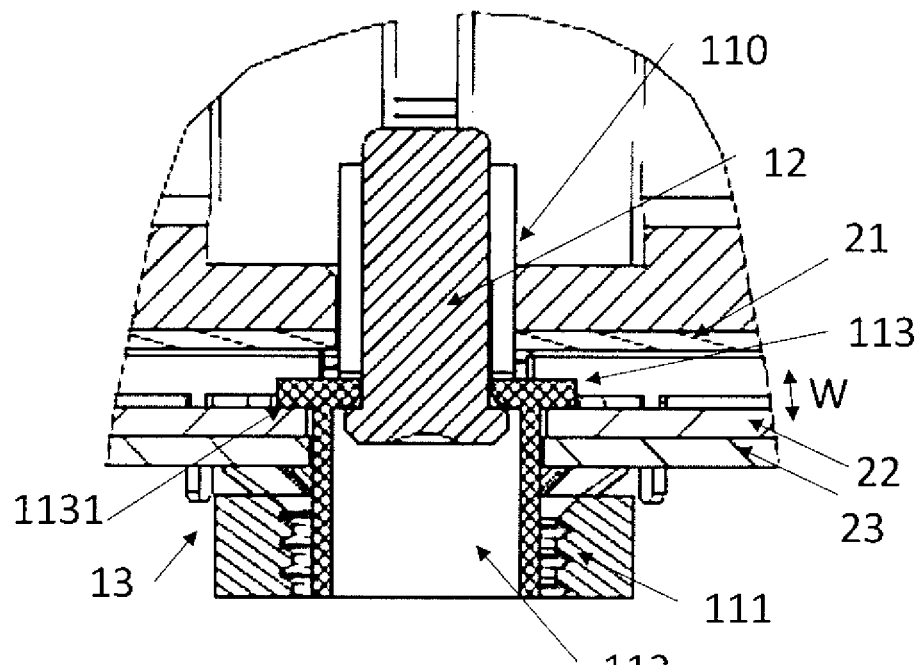
FIG. 4 shows a section of the stop of the installed expanding rivet in FIG. 2 according to an implementation of this invention.

FIG. 4 shows a section of the stop 113 for an expanding rivet 11 as shown in FIG. 2. This view is equivalent to FIG. 3 but rotated by 90 degrees. The identifiers used in FIGS. 1, 2 and 3 refer to the same parts, which is why they are not repeated here. The representation in FIG. 4 shows the fully pre-tensioned and joined components 21, 22, 23, spring-loaded by spacer 114, i.e. the nut 13 has been screwed to the position where the spring washer is fully pre-tensioned. The stop 113 and the spacer 114 are located between the first component to be joined 21, which, in the case of RF applications, might be an antenna element, e.g. a dipole installed on a circuit board, and the second component 22, which, in the case of RF applications might be a screening cover. The stop 113 has preferably a lesser thickness than the distance between the two components to be joined 21 and 22. The stop 113 has a surface 1131 facing the threaded side 111 of the expanding rivet 11; its arrangement prevents the expanding rivet 11 from being pulled out when the clamping element 13 is tightened. In this case, a certain length, e.g. 1 mm, of the expanding rivet 11 is able to be pulled through the component, e.g. 1 mm, in this example the screening cover 21, but then this will make contact with component 22 and its surface 1131, so that the expanding rivet 11 cannot be pulled out any further. This means that this stop 113 allows the construction of a path-controlled pre-tensioning, with the thickness of the stop and the distance between the components to be joined defining the path W for the pre-tensioning. The advantage of this is that, during assembly, it can be adjusted very accurately to which degree the expanding rivet 11 has to be tightened in order to obtain a play-free connection between the components to be joined. In order to finally tighten the connection, the nut can be tightened applying a controlled torque, with the stop 113 preventing slipping or pulling out of the expanding rivet 11.

In addition, stop 113 on expanding rivet 11 (or several stops 113 placed at different locations; not shown in the figures) allows the implementation of various pre-tensional forces between the different components to be joined, e.g. between the dipole and the screening cover and between the circuit board and the adapter plate.

The expanding rivet connection according to this invention provides the option to carry out a multi-stage assembly. This means that, first of all, two of the components to be joined are connected together by means of an expanding rivet and expanding rivet mandrel or that an expanding rivet with an expanding rivet mandrel is inserted in just one of the components. These connected components can then be treated in a further processing step, such as a wave soldering bath or other processes, for example, to create an electrically conducting connection between them. Then, one or several further components to be joined can be mounted on the same side by means of the threaded part and the spring element to the two joined components, in such a way that a play-free connection is created. Furthermore, the pre-tensioning allows a thickness compensation and compensation of variations between the components to be joined so that slippage between the components is prevented. By means of the provision of a stop, a path-controlled pre-tensioning is realized and it is prevented that the expanding rivet is pulled out of the components to be joined when the clamping element is tightened.

LIST OF IDENTIFIERS

100 Expanding rivet connection
11 Expanding rivet
110 Expanding rivet body
111 Threaded part
112 Opening in the expanding rivet
113 Stop
1131 Upper side of the stop
114 Spacer
115 Jaws
12 Expanding rivet mandrel
13 Clamping element
21 First component to be joined
22 Second component to be joined
23 Third component to be joined
W Travel for pre-tensioning

The invention claimed is:
1. An expanding rivet connection (100) for connection of at least two components to be joined (21, 22) comprising:
    an expanding rivet (11) comprising
        an expanding rivet body (110), which is shaped so that it can be inserted through openings into the first component to be joined (21), and
        a threaded part (111), which is shaped so that it protrudes, at least in part, after insertion from the first component to be joined (21),
    an expanding rivet mandrel (12), which is constructed so that it can be pushed through an opening (112) in the expanding rivet (11) into the expanding rivet body (110) in order to protrude through the first component to be joined (21), and a clamping element (13), which is constructed to be screwed to the threaded part (111) of the expanding rivet (11) in order to connect at least the second component to be joined (22) to the first component to be joined (21) at a distance from each other; and at least one stop (113) arranged at the expanding rivet (11) at least between the expanding rivet body (110) and the threaded part (111).

2. The expanding rivet connection (100) according to claim 1 for the connection of at least three components to be joined (21, 22, 23) wherein:

the expanding rivet body (110) is shaped in such a way that it can be inserted in addition through openings in a second component (22) arranged on the first component to be joined (21) and the threaded part (111) is constructed in such a way that, after insertion, it protrudes at least in part from the first component to be joined (21) and the second component to be joined (22), the expanding rivet mandrel (12) is constructed so that it can be pushed through the opening (112) in the expanding rivet (11) into the expanding rivet body (110) in order to join the first (21) and the second components to be joined (22) together and the clamping element (13) is constructed to be screwed to the threaded part (111) of the expanding rivet (11) in order to connect at least a third component to be joined (23), which is arranged on the second component (22) already joined to the first component to be joined (21).

3. The expanding rivet connection according to claim 1, wherein the clamping element (13) is constructed as a spring element in the form of a nut with a spring washer.

4. The expanding rivet connection according to claim 1, wherein the expanding rivet body (110) is round or n-cornered and the threaded part (111) is n-cornered.

5. The expanding rivet connection according to claim 1, wherein the stop (113) is constructed in such a way that the surface (1131) facing the threaded part (111) serves to protect the expanding rivet (11) against being pulled out when the clamping element (13) is screwed tight and where the thickness of the stop (113) determines the travel (W) of the pre-tension generated by screwing tight the clamping element (13).

6. The expanding rivet connection according to claim 1, wherein at least one spacer (114) is arranged at the expanding rivet (11) between the expanding rivet body (110) and the threaded part (111).

7. The expanding rivet connection according to claim 6, wherein the spacer (114) is connected to the expanding rivet (11) via at least one elastic element.

8. The expanding rivet connection according to claim 6, wherein two spacers are (114) located opposite each other on the expanding rivet (11) between the expanding rivet body (110) and the threaded part (111).

9. The expanding rivet connection according to claim 6, wherein the thickness of the spacer (114) corresponds to the distance between the two components to be joined (22, 23).

10. The expanding rivet connection according to claim 6, wherein each of the spacers (114) is shaped differently or identically as a cylinder, sphere, cone or double cone or being rectangular.

11. The expanding rivet connection according to claim 6, wherein the spacer (114) encloses the circumference of the threaded part (111).

12. The expanding rivet connection according claim 1, wherein the expanding rivet body (110) and/or the threaded part (111) and/or the expanding rivet mandrel (12) and/or the clamping element (13) are made from glass fiber-reinforced plastic.

13. A method for mounting the expanding rivet connection (100) of claim 1 comprising the steps of:

Step 1: Insertion of the expanding rivet body (110) of the expanding rivet (11) into openings in the first component to be joined (21) and the other or additional component(s) to be joined (22), if present, Step 2: Insertion of the expanding rivet mandrel (12) into the opening (112) in the expanding rivet (11) so that a firm connection is made between the first component to be joined (21) and the other (or additional) component(s) to be joined (22), if present, Step 3: Application of a third component to be joined (23) to be joined onto the first component to be joined (21) or any other component(s) to be joined (22) already joined to the first component to be joined (21) via the threaded part (111) of the expanding rivet (11), Step 4: Attachment of at least one third component to be joined (23) to be joined by means of the clamping element (13) to the first component to be joined (21) or to the other or additional component(s) to be joined (22) already joined with the first component to be joined (21).

14. The method according to claim 13 with the process comprising, between steps 2 and step 3, a further step 2a: introduction of the first component to be joined (21) being provided with the expanding rivet (11), or of the joint first and further components to be joined (21, 22) being provided with the expanding rivet (11) into a device for forming electrical connections between the components to be joined (21, 22).

* * * * *